United States Patent [19]
Palau et al.

[11] Patent Number: 5,890,990
[45] Date of Patent: Apr. 6, 1999

[54] PROCESS OF ASSEMBLING AN EPICYCLIC REDUCTION GEAR AND EPICYCLIC REDUCTION GEAR

[75] Inventors: Joseph Palau, Annecy; Vincent Gerat, Saint Jorioz, both of France

[73] Assignee: Staubli Faverges, Faverges, France

[21] Appl. No.: 922,537

[22] Filed: Sep. 3, 1997

[30] Foreign Application Priority Data

Sep. 10, 1996 [FR] France ................................. 96 11234

[51] Int. Cl.⁶ .................................................. F16H 1/48
[52] U.S. Cl. ......................................................... 475/346
[58] Field of Search ................................. 475/331, 341, 475/346

[56] References Cited

U.S. PATENT DOCUMENTS

| | | | |
|---|---|---|---|
| 1,432,090 | 10/1922 | Simpson | 475/341 |
| 3,315,547 | 4/1967 | Fritsch | 475/346 |
| 3,635,103 | 1/1972 | Monti | 475/346 |

FOREIGN PATENT DOCUMENTS

| | | |
|---|---|---|
| 93584 | 4/1983 | European Pat. Off. . |
| 2661963 | 5/1990 | France . |
| 2648154 | 5/1977 | Germany . |
| 4026886 | 2/1992 | Germany . |
| 267733 | 3/1927 | United Kingdom . |
| 1411380 | 10/1975 | United Kingdom . |
| 2195002 | 3/1988 | United Kingdom . |

*Primary Examiner*—Dirk Wright
*Attorney, Agent, or Firm*—Dowell & Dowell, P.C.

[57] ABSTRACT

A process for assembling and an epicyclic reduction gear comprising a plurality of planets provided with outer toothings moveable rotatable about a shaft which are engaged with the toothings of, at least one adjacent gear ring. The shaft of the planets is mounted on a planet-holder so that it is adapted to move with respect to said planet-holder both radially and angularly in a plane perpendicular to the principal shaft of the reduction gear. The rotation shaft of each planet may be radially and angularly adjusted to a position where its outer toothing meshes with the toothing of the adjacent gear ring and may thereafter be secured in position.

15 Claims, 5 Drawing Sheets

5,890,990

PROCESS OF ASSEMBLING AN EPICYCLIC REDUCTION GEAR AND EPICYCLIC REDUCTION GEAR

BACKGROUND OF THE INVENTION

1. Field of the Invention

The present invention relates to a process for assembling an epicyclic reduction gear and to an epicyclic reduction gear.

2. History of the Related Art

An epicyclic reduction gear is known to transmit a movement of rotation between a driving shaft and a driven shaft by means of one or more planets. In the epicyclic reduction gears of the prior art, the toothings of the peripheral gear ring and of each planet must be produced with great precision in order to allow correct operation of the device and avoid premature wear. Similarly, the planet-holder must be produced with low manufacturing tolerances and the planets must be assembled on this planet-holder with precision. In addition, the installation of the planets, in a position allowing engagement of their outer toothing with the inner toothing of one or more peripheral gear rings and/or a central shaft, must be effected with the greatest care.

Bearing the foregoing in mind, manufacture of an epicyclic reduction gear is a long and delicate operation and the cost of manufacturing such a reduction gear is relatively high, which prevents it from being used on devices whose objective cost is low.

It is an object of the invention to overcome these problems by proposing to master positioning of a planet with respect to one or more peripheral gear rings and/or with respect to a central shaft in optimum manner, while the manufacturing tolerances of the toothings and the bores may be sufficiently great for the cost of an epicyclic reduction gear to be competitive.

SUMMARY OF THE INVENTION

To that end, the invention relates to a process for assembling an epicyclic reduction gear comprising a plurality of planets provided with an outer toothing mobile in rotation about a shaft, at least one peripheral gear ring provided with an inner toothing and/or a central shaft provided with an outer toothing, characterized in that it consists in mounting the shaft of said planets on a planet-holder so that it is adapted to move with respect to the planet-holder radially and angularly in a plane perpendicular to the principal axis of the reduction gear, in radially and/or angularly displacing the rotation shaft of each planet up to a position where its outer toothing meshes with the toothing of the peripheral gear ring or of said central shaft, and in immobilizing said rotation shaft in this position with respect to said planet-holder.

Thanks to the invention, the precision of the engagement of the toothings is obtained by the radial and/or angular displacement of the shafts of the planets with respect to the planet-holder. The position obtained at the end of displacement is easily attained as it is defined by the stop of each planet with respect to the toothing of a peripheral gear ring or of a central shaft.

According to an advantageous aspect of the process of the invention, the shaft of each planet is immobilized with respect to the planet-holder by an axial tightening force. In this way, no radial force is exerted on the shaft of each planet, thus allowing correct rotation of the planet with respect to its shaft.

The invention also relates to an epicyclic reduction gear for carrying out the process of the invention and more precisely to an epicyclic reduction gear including a plurality of planets provided with an outer toothing and each mobile in rotation about a shaft. At least one peripheral gear ring is provided with an inner toothing and/or a central shaft provided with an outer toothing. The shaft of the planets is mounted on a planet-holder which is radially and angularly mobile in a plane perpendicular to the principal axis of the reduction gear.

In the reduction gear of the invention, the shaft of each planet may be displaced radially and/or angularly so that the planet with which it is associated has an optimum position with respect to the toothing with which it must cooperate.

In accordance with a first advantageous aspect of the invention, the planet-holder is provided with a plurality of holes adapted to receive an element belonging to or secured with the shaft of the planets. Each hole has dimensions, in a plane perpendicular to the principal axis, greater than the dimensions of the element in the same plane, with the result that a clearance is created between the element and the hole. These holes therefore allow the radial and angular displacement of the rotation shafts of the planets.

In accordance with another advantageous aspect of the invention, each planet includes an outer toothing mounted on its rotation shaft by means of a needle roller bearing. This construction allows a rotation of the gear ring with respect to the shaft of the planet with a low coefficient of friction.

According to a first variant of the invention, the reduction gear includes a second peripheral gear ring provided with an inner toothing adapted to mesh with the planets. It is also possible to provide that the toothings of the first and of the second peripheral gear rings have different numbers of teeth. This distribution of the number of the teeth of the peripheral gear rings allows a relative movement of rotation of one of the peripheral gear rings with respect to the other, this movement being generated by the rotation of the planets which have different tangential speeds with respect to the two peripheral gear rings.

According to a particularly advantageous aspect of the invention, the difference of the number of teeth of the toothings of the first and second peripheral gear rings is equal to the number of planets of the reduction gear or to a whole multiple of the number of planets, with the result that, when the two gear rings are centered on the same axis, their toothings present two profiles which are exactly superposed at a number of points equal to the number of planets of the reduction gear or to a whole multiple of this number of planets.

It is also possible to provide that the reduction gear includes two central shafts provided with outer toothings of which the numbers of teeth are distributed in the same way.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
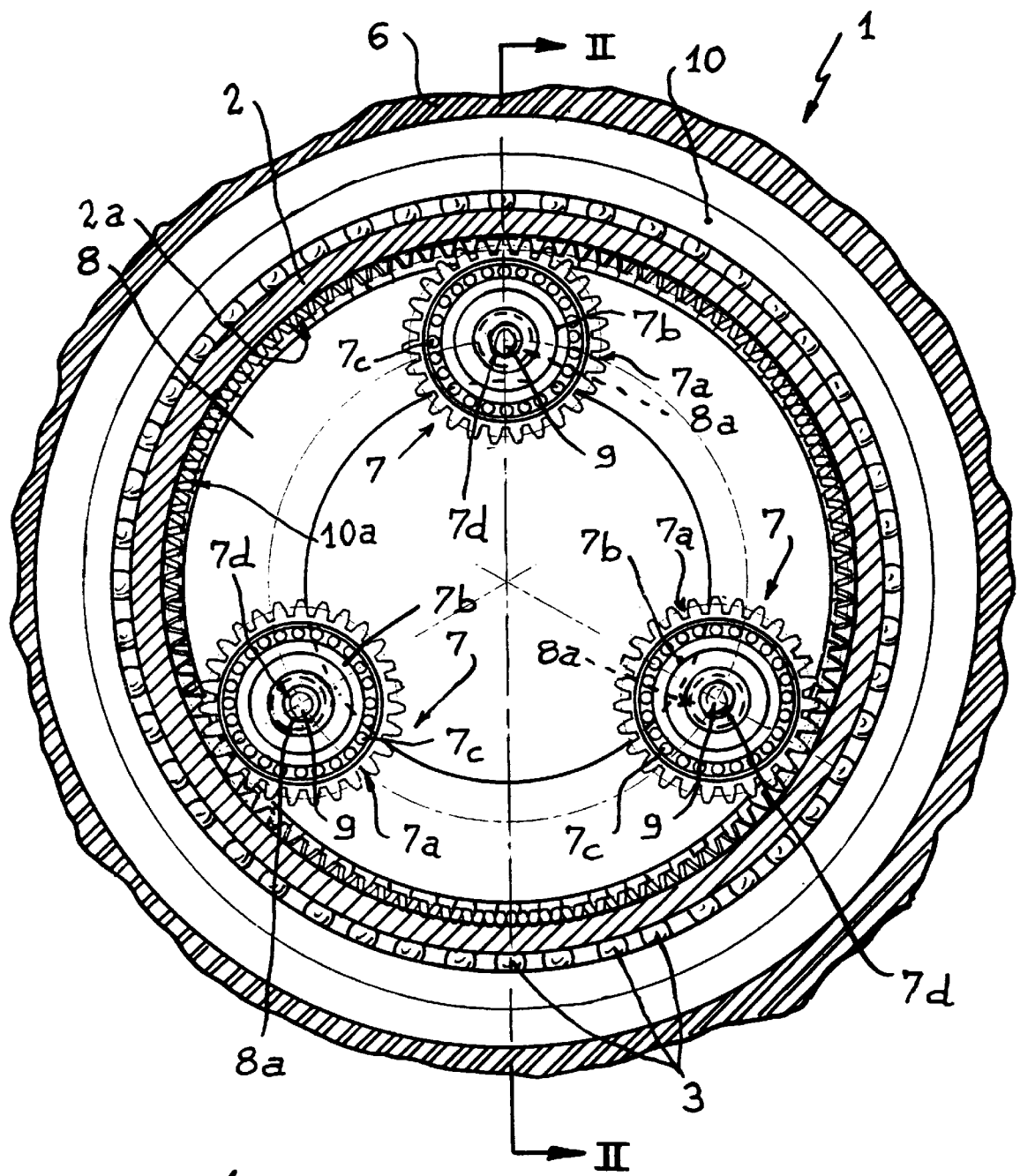
FIG. 1 is a view in transverse section of an epicyclic reduction gear in accordance with a first embodiment of the invention.

Referring now to the drawings, the epicyclic reduction gear 1 shown in FIG. 1 includes a peripheral gear ring 2 provided with an inner toothing 2a. This peripheral gear ring 2 is maintained, by means of a ball bearing 3, inside a fixed frame 6. Three planets 7 are regularly distributed over the inner toothing 2a and each comprise an outer toothing 7a capable of meshing with the toothing 2a. Each planet 7 comprises a rotation shaft 7b around which the toothing 7a is mobile by means of a needle roller bearing 7c. The reduction gear 1 also includes a planet-holder 8 on which the shafts 7b of the planets 7 may be mounted. To that end, the planet holder 8 includes holes 8a in a number equal to the number of planets that it must support. A screw 9 may be inserted in each hole 8a and screwed in a tapped axial bore 7d and the shaft 7b, this bore being opening or not. Each hole 8a is circular in shape, this being more clearly shown in FIGS. 1 and 3.

The hole 8a has a diameter substantially greater than that of the threaded part of the screw 9 but smaller than that of the head of this screw, so that the latter may move inside the hole and also exert an axial tightening effort on the shaft 7b.

Figure 3:
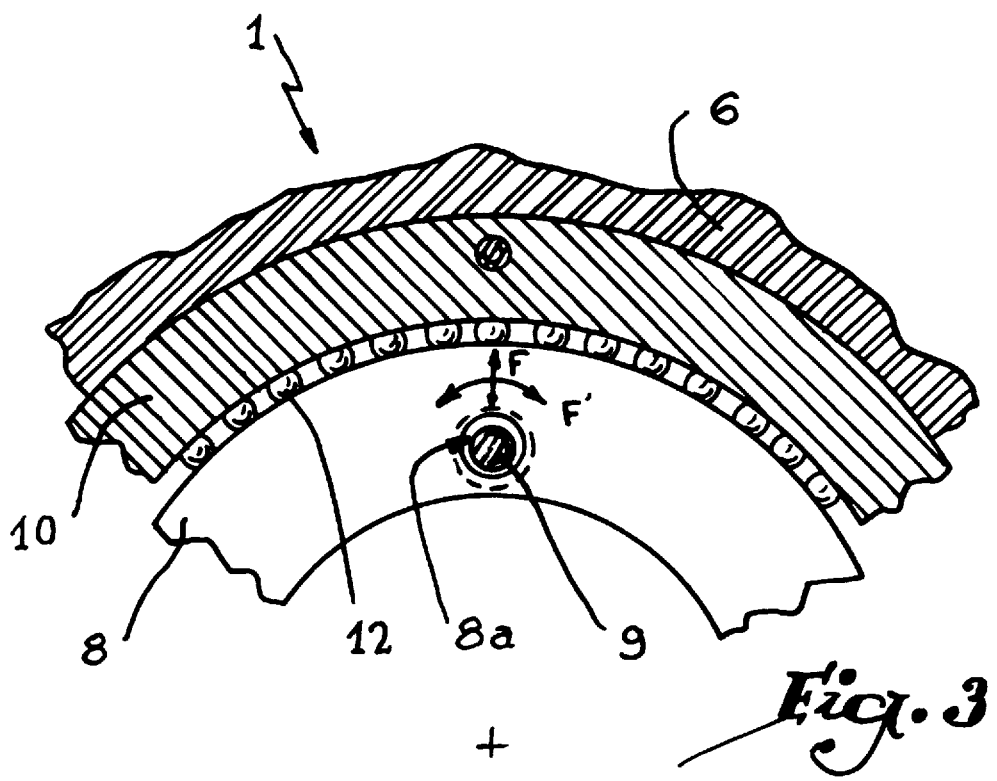
FIG. 3 is a view in section along line III—III in FIG. 2.

Thus, in the plane of FIG. 1, which is a plane perpendicular to the principal axis XX' of the reduction gear, the hole 8a has dimensions greater than those of the screw 9 in this same plane, with the result that a clearance is created between the screw 9 and the hole 8a and the screw 9 may be displaced radially and angularly, in the direction of arrows F and F' of FIG. 3, inside the hole 8a. The shaft 7b of the planet 7 is mounted on the planet holder 8, being mobile radially and angularly with respect to the principal axis XX' of the reduction gear 1.

Thanks to this construction of the reduction gear 1, it may be assembled as follows: the shaft 7b of each planet 7 is firstly mounted on the planet-holder by inserting the screw 9 in the hole 8a and in the tapped axial bore 7d without tightening the screw 9 completely, so that the shafts 7b of the planets 7 can move radially and angularly with respect to the planet-holder, by reason of the degrees of freedom due to the clearance between the hole 8a and the screw 9. The toothing 7a of each planet may be mounted on the rotation shaft 7b before or after assembly thereof on the planet-holder 8. In any case, when the toothing and the shaft are mounted on the planet-holder 8, the rotation shaft of each planet is displaced radially and/or angularly in the direction of the inner toothing 2a of the gear ring 2 up to a position where the outer toothing 7a meshes correctly with the inner toothing 2a. The planet is thus positioned in optimum manner with respect to the peripheral gear ring 2, which makes it possible to reduce considerably, and even eliminate, the engagement clearance of the toothings in contact without inducing pre-stress on the planet or the peripheral gear ring. This simplifies assembly considerably.

When the planet is in its optimum position of engagement obtained thanks to its displacement, it may be immobilized in this position by an axial effort due to the tightening of the screw 9, to maintain an optimum engagement. In this way, thanks to this process of assembling an epicyclic reduction gear, a uniform clearance and/or of the pre-stresses on all the planets of the epicyclic reduction gears is obtained simply, while the manufacturing tolerances of the elements constituting the reduction gear may be increased without this being detrimental to the quality of the reduction gear once mounted.

A second peripheral gear ring 10 provided with an inner toothing 10a, whose diameter is substantially equal to that of the inner toothing 2a of the peripheral gear ring 2, is mounted around axis XX'. The inner toothing 10a may come into engagement, i.e. mesh with the outer toothing of each of the planets 7. For example, it may be provided that the gear ring 10 be fixed with respect to the frame 6. The balls of the bearing 3 are disposed inside a cage formed by the outer surfaces of the peripheral gear rings 2 and 10. These balls constitute a bearing allowing the rotation of the peripheral gear ring 2 with respect to the peripheral gear ring 10. In this way, the peripheral gear ring 2 may constitute the driving or driven element of the movement of the reduction gear 2, while the corresponding driven or driving element is constituted by the planet-holder 8.

In the event of a slight difference in diameter of the inner toothings 2a and 10a, the planets displaced towards the gear rings 2 and 10 come into abutment against the tooting of smallest diameter and thus naturally find an optimum position of engagement. The invention therefore enables a slight difference in diameter of the inner toothings 2a and 10a to be easily compensated.

In accordance with a particularly advantageous aspect of the invention, the inner toothings 2a and 10 a have different numbers of teeth. More specifically, the difference in the number of teeth of toothings 2a and 10a is equal to the number of planets 7, i.e. three in the present case, with the result that the toothings 2a and 10a present aligned teeth at three points equally distributed over the toothings 2a and 10a, these three points corresponding to the housings of the three planets 7. This difference in the number of teeth of the two inner toothings 2a and 10a makes it possible to guarantee that the planets 7 are permanently maintained at an angular distance corresponding to that of the points at which the toothings 2a and 10a present aligned teeth. In fact, the outer toothing 7a of each planet 7 must be able to mesh with both toothing 2a and 10a.

It is also possible to provide that the difference in the number of teeth of the gear rings 2 and 10 is equal to a whole multiple of the number of planets, which also makes it possible to distribute the planets regularly over the circumference of the toothings 2a and 10a.

A set of balls 12 is inserted between the planet-holder 8 and the peripheral gear ring 10, with the result that they constitute a bearing allowing the planet-holder to be maintained in position and to rotate about axis XX'.

Figure 5:
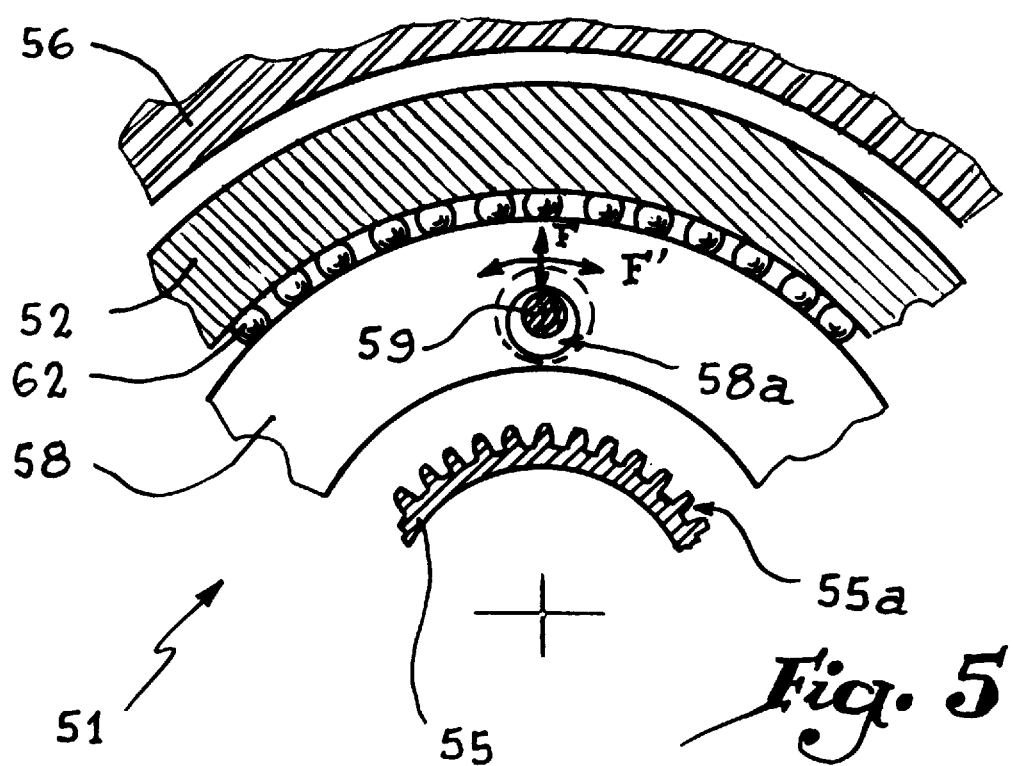
FIG. 5 is a view in section along line V—V of FIG. 4.
Figure 4:
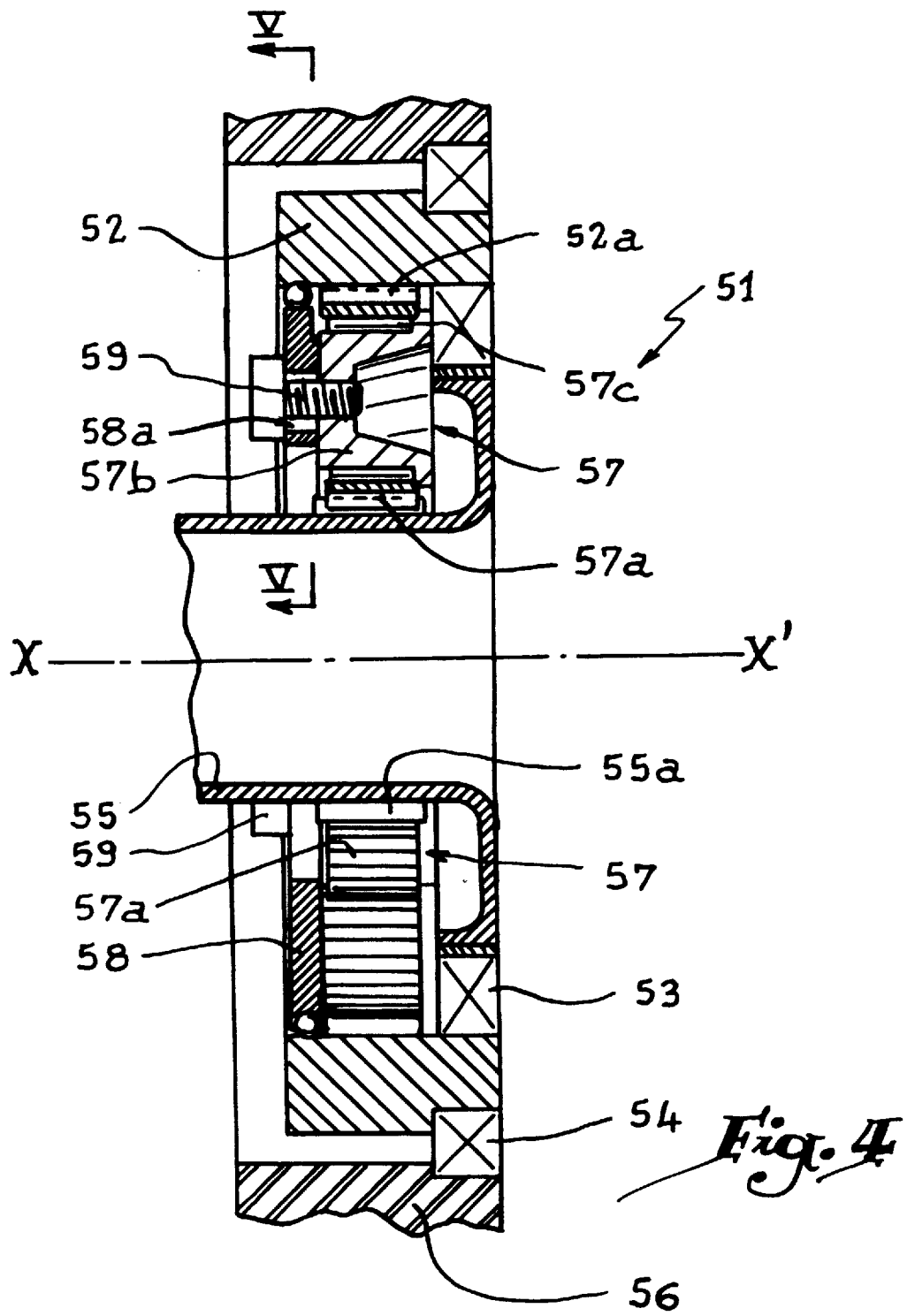
FIG. 4 is a view similar to FIG. 2 for a second embodiment of the invention.

The epicyclic reduction gear 51 of the second embodiment shown in FIGS. 4 and 5 differs from the preceding one essentially in that a central shaft 55 is provided with an outer toothing 55a while a single gear ring 52 is provided on the periphery of the reduction gear, it also being provided with a toothing 52a. In FIGS. 4 and 5, the elements similar to those of the embodiment of FIGS. 1 and 2 bear identical references increased by 50.

Figure 2:
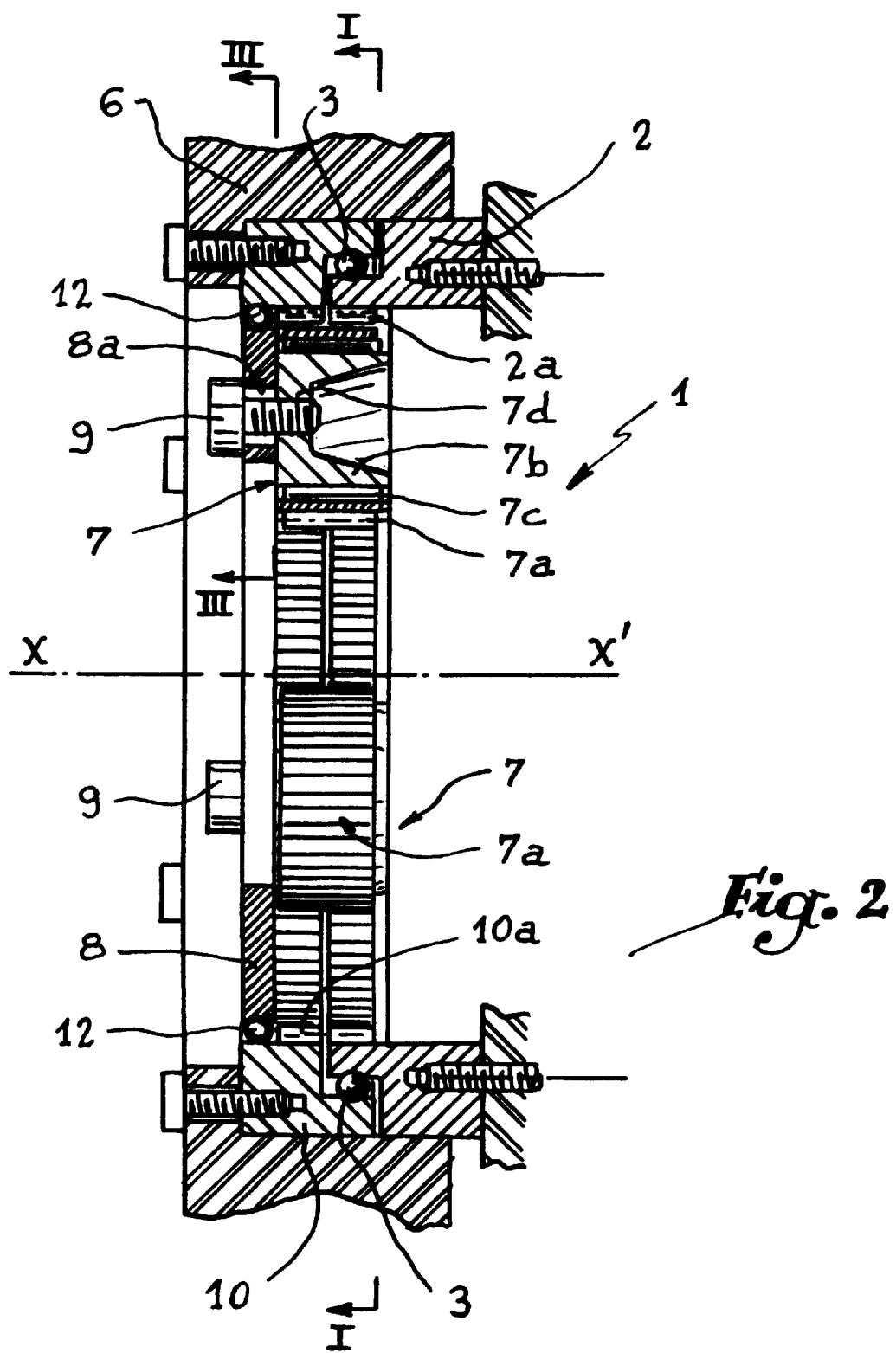
FIG. 2 is a view in longitudinal section along line II—II in FIG. 1; the plane of section of FIG. 1 is represented by line I—I.

The planets 57 of this embodiment are identical to those of the embodiment of FIGS. 1 to 3 and include a toothing 57a mobile in rotation about a shaft 57b by means of a needle roller bearing 57c. As in the preceding embodiment, the process of assembly consists essentially in mounting the shaft 57b of each planet 57 on a planet-holder 58, so that it is adapted to move radially and angularly with respect to said planet-holder, thanks to a screw 59 secured to the shaft 57b and moving in a hole 58a in the planet-holder 58, to displace the screw 59 radially and/or angularly in the hole 58a up to a position of engagement, and to immobilize each planet in position.

The hole 58a is formed by a circular orifice whose diameter is substantially greater than that of the threaded part of the screw 59 but smaller than that of the head of this screw. Thanks to the difference in the diameters of the screw 59 and of the hole 58a, the shaft 57b is mobile radially and angularly with respect to the planet-holder 58a as is represented by arrows F and F' in FIG. 5.

In the course of assembly, each planet is displaced to a position where its outer toothing 57a meshes in optimum manner both with the inner toothing 52a of the peripheral gear ring 52 and the outer toothing 55a of the central shaft 55.

Figure 6:
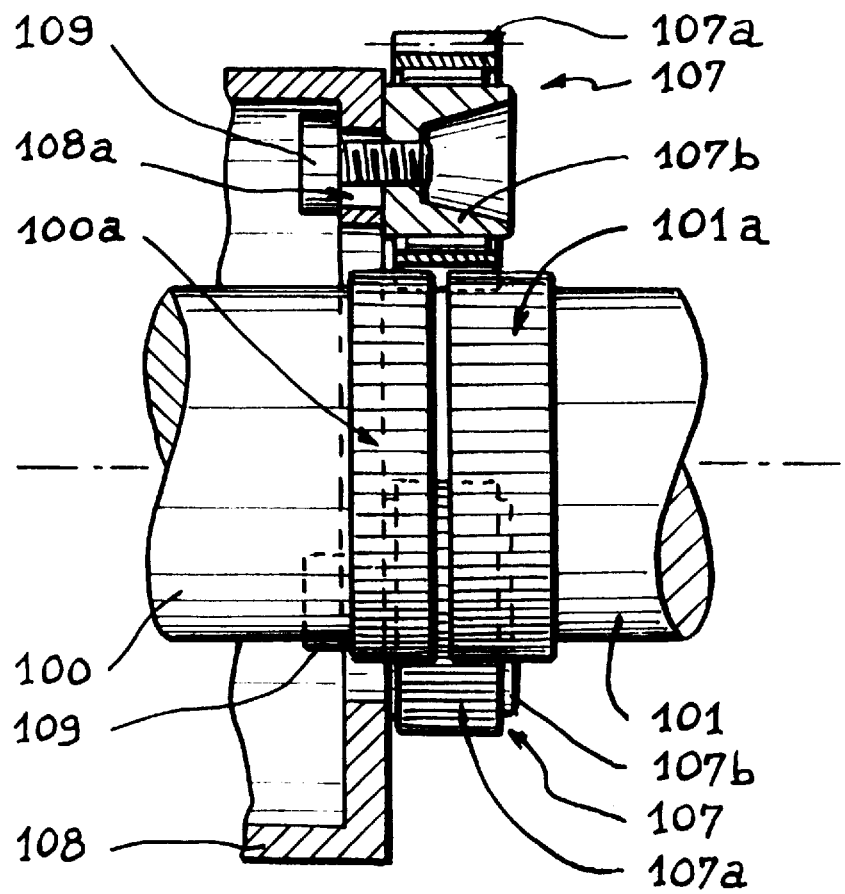
FIG. 6 is a cross-sectional view of another embodiment of the invention.

In accordance with an embodiment of the invention shown in FIG. 6 of the drawings, it is also possible to provide that the epicyclic reduction gear includes two central shafts 100 and 101, each of which is provided with an outer toothing 100a and 101a of which one is fixed and which together mesh with the toothings of the planet.

The elements similar to those of the embodiment of FIGS. 1 and 2 bear identical references increased by 100. The planets 107 of this embodiment are identical to those of the embodiment of FIGS. 1 to 3 and include a toothing 107a mobile in rotation about a shaft 107b by means of a needle roller bearing. As in the preceding embodiment, the process of assembly consists essentially in mounting the shaft 107b of each planet on a planet-holder 108, so that it is adapted to move radially and angularly with respect to the planet-holder. A screw 109 is secured with the shaft 107b and moves in a hole 108a in the planet-holder. The screw 109 is moveable radially and/or angularly in the hole to a position of engagement, and is thereafter used to secure each planet in position.

The hole 108a is formed by a circular orifice whose diameter is substantially greater than that of the threaded part of the screw 109 but smaller than that of the head of the screw. Because of the difference in the diameters of the screw and of the hole, the shaft 107b is mobile radially and angularly with respect to the planet-holder 108a in a manner similar to the movement represented by arrows F and F' in FIG. 5.

In the course of assembly, each planet is displaced to a position where its outer toothing 107a meshes in optimum manner both with the outer toothing 100a and 101a of the central shafts 100 and 101.

The central shafts have toothings of which the number of teeth are different, by a difference equal to the number of planets or to a whole multiple of this number. The central shaft which is not fixed in that case constitutes the driving or driven element of the movement of the reduction gear while the planet-holder constitutes the driven or driving element thereof.

The manner in which the rotation shaft of each planet is fixed on the planet-holder may also vary. The rotation shaft of each planet may comprise a catch traversing a hole in the planet-holder, this catch bearing an immobilization means such as for example a thread allowing a nut to be mounted or an orifice allowing he passage of a pin, a wedge or any other equivalent means. Such modifications are within the scope of the man skilled in the art and do not depart from the scope of the invention.

What is claimed is:

1. In an epicyclic reduction gear having a principal axis of rotation and including a plurality of planets provided with an outer toothing and wherein each of the planets is rotatably mounted on a shaft, and wherein the outer toothings of the plurality of planets are intermeshed with the toothing of a first adjacent gear ring, the improvement comprising, a planet holder and means for mounting at least one of the plurality of planets so as to be selectively both radially and angularly adjustable to said planet holder in a plane generally perpendicularly to the principal axis of the reduction gear.

2. The epicyclic reduction gear of claim 1 including means for securing said at least one planet in an adjusted position to the planet holder.

3. The epicyclic reduction gear of claim 2, wherein said means for mounting the at least one of the plurality of planets includes at least one opening in said planet holder which opening is of a first dimension, a fastening element including a shank portion extending through said at least one opening and connected to the shaft of the at least one of the plurality of planets, said shank portion being of a cross sectional dimension which is less than said first dimension so that said fastening element is selectively radially and angularly adjustable relative to the principal axis of the reduction gear within said at least one opening.

4. The epicyclic reduction gear of claim 3 in which said means for securing includes said fastening element having a threaded portion engageable with the shaft of said at least one planet and being adjustable to securely engage said at least one planet to the planet-holder.

5. The epicyclic reduction gear of claim 4 including a tapped bore in the shaft for receiving said threaded portion.

6. The epicyclic reduction gear of claim 3 including means for mounting the plurality of planets so as to be selectively both radially and angularly adjustable to said planet holder in a plane generally perpendicular to the principle axis of the reduction gear.

7. The epicyclic reduction gear of claim 6 wherein each planet includes a roller bearing mounted between the said outer toothing in the shaft.

8. The epicyclic reduction gear of claim 6 in which the toothings of the plurality of planets are intermeshed with the toothings of a second adjacent gear ring.

9. The epicyclic reduction gear of claim 7 wherein the number of teeth of said toothings of said first adjacent gear ring are different than the number of teeth of the toothings of the said second adjacent gear ring.

10. The epicyclic reduction gear of claim 8 wherein the number of teeth of said toothings of said first and second adjacent gear rings is equal to the number of planets of the reduction gear or to a whole multiple of the number of planets of the reduction gear.

11. The epicyclic reduction gear of claim 9 wherein one of said first and second adjacent gear rings is a driven gear and the other of said first and second adjacent gear rings is a driving gear.

12. The epicyclic reduction gear of claim 7 wherein said toothings of said first and second adjacent gear rings are outer toothings extending from a central shaft.

13. The epicyclic reduction gear of claim 7 wherein said toothings of said first and second adjacent gear rings are inner toothings of peripheral gear rings.

14. A process for assembling an epicyclic reduction gear which includes a plurality of planets each provided with outer toothings which rotate about a shaft and at least one adjacent gear ring providing with a toothing which meshes with the toothings of the plurality of planets, the process comprising the steps of:

A. mounting the shaft of at least one of said planets on a planet holder so as to be selectively adjustable with respect to the planet holder both radially and angularly in a plane perpendicular to a principle axis of the reduction gear;

B. radially and angularly displacing the shaft of said at least one planet to a position where its outer toothing meshes with said toothing of the adjacent gear ring; and C. thereafter securing said shaft of said at least one planet with respect to the planet holder to thereby retain said at least one planet in an adjusted position.

15. The process of claim 11 wherein the step of securing includes axially tightening the shaft of said at least one planet relative to the said planet holder.

* * * * *